United States Patent [19]

Watabe et al.

[11] 3,813,162

[45] May 28, 1974

[54] APPARATUS FOR FORMING RELIEF PRINTING PLATE FROM LIQUID PHOTO-SENSITIVE RESIN

[75] Inventors: Kaname Watabe, Osaka; Kosuke Arai, Tokyo; Yasuo Taneda, Tokyo; Kiyomi Naka, Tokyo, all of Japan

[73] Assignee: Teijin Limited, Osaka, Japan

[22] Filed: Apr. 27, 1973

[21] Appl. No.: 355,282

[30] Foreign Application Priority Data

May 11, 1972 Japan .............................. 47-45932

[52] U.S. Cl. .................... 355/85, 95/89 R, 96/35.1, 355/99

[51] Int. Cl. ........................................ G03b 27/04

[58] Field of Search ............ 355/85, 91, 78, 97, 99, 355/87, 132, 133; 95/89 R; 96/35.1

[56] References Cited

UNITED STATES PATENTS

| | | | |
|---|---|---|---|
| 3,520,606 | 7/1970 | Gush et al. | 355/85 |
| 3,597,080 | 8/1971 | Gush et al. | 355/85 |
| 3,635,711 | 1/1972 | Miller et al. | 96/35.1 |

*Primary Examiner*—Richard L. Moses
*Attorney, Agent, or Firm*—Wenderoth, Lind & Ponack

[57] ABSTRACT

Apparatus for forming a relief printing plate has a spacer frame removably and closely fitted on a hollow structure to hold a transparent cover film therebetween. The hollow structure has a source of ultraviolet rays therein and is closed at its upper portion with a transparent glass plate on which an image bearing negative and the transparent cover film are laminated in that order. The spacer frame has three frame sides for guiding the liquid photo-sensitive resin upon the cover film and one remaining frame side for discharging superfluous resin. The liquid photo-sensitive resin is supplied through the middle side frame of the three frame sides.

6 Claims, 4 Drawing Figures

APPARATUS FOR FORMING RELIEF PRINTING PLATE FROM LIQUID PHOTO-SENSITIVE RESIN

DISCLOSURE

This invention relates to an apparatus for forming a relief printing plate from a liquid photo-sensitive resin.

Recently, in place of lead stereotype, a liquid photo-sensitive resin has been used for forming a relief printing plate. In a known method to form such a printing plate, an image bearing negative is placed upon a transparent glass plate in close contact therewith and covered with a thin transparent film. On the transparent film is spread a liquid photo-sensitive resin which is covered with a supporting base plate. Then, ultraviolet rays are applied to the liquid photo-sensitive resin through the image bearing negative, whereby the liquid photo-sensitive resin exposed to the rays becomes insoluble due to a photo-polymerization reaction. The liquid photo-sensitive resin not exposed to the rays is washed-out by a wash-out solution such as an alkaline aqueous solution. Then, the board is washed by a rinsing liquid such as water. The thus obtained relief plate is then subjected to drying and post-exposure treatments for use as a printing plate.

In order to form a relief printing plate the thickness of which is on the order of 0.2 to 5 mm., it has been proposed to form a hermetical sealed space between a glass plate placed on a shoulder portion of a hollow structure in such a manner that the top surface of the glass plate is at a lower level than that of the hollow structure and a supporting base plate placed on the top surface of the hollow structure. The glass plate is laminated with an image bearing negative and a transparent cover film in that order, which are placed in close contact with each other by evacuating any air therebetween. The transparent cover film is further attached to the hollow structure by a rubber O-ring which presses the periphery of the cover film into a peripheral groove in the top surface of the hollow structure. A liquid photo-sensitive resin is fed into the space between the transparent cover film and the supporting base plate, which space corresponds to the thickness of the relief printing plate to be formed.

In such a structure, however, it is a troublesome operation to set the O-ring in the peripheral groove of the hollow structure and the operator's hands will be dirtied by the O-ring stained with the resin when the O-ring is removed when replacing the negative.

Accordingly, an object of the present invention is to provide an apparatus for forming a relief printing plate from a liquid photo-sensitive resin, in which a transparent cover film is placed on an image bearing negative in close contact therewith with ease without dirtying the operator's hands.

Another object of the present invention is to provide an apparatus of the type defined above, in which a liquid photo-sensitive resin is speedily and homogeneously spread over the transparent cover film without intrusion of foams.

Another object of the present invention is to provide an apparatus of the type defined above, in which transparent cover films are successively supplied onto an image bearing negative placed on a glass plate under a fixed tension.

Another object of the present invention is to provide an apparatus of the type defined above, in which a predetermined amount of liquid photo-sensitive resin is supplied onto the cover film without intrusion of foams.

A further object of the present invention is to provide an apparatus of the type defined above, in which supporting base plates for the liquid photo-sensitive resin are successively supplied with ease.

According to the present apparatus for forming a relief printing plate from a liquid photo-sensitive resin, there is provided a spacer frame removably fitted on a hollow structure in close contact therewith to hold a transparent cover film therebetween, the hollow structure having a source of ultraviolet rays therein and being closed at its upper portion with a transparent glass plate on which an image bearing negative and the transparent cover film are laminated in that order. The spacer frame has three frame sides for guiding the liquid photo-sensitive resin upon the cover film and one remaining frame side for discharging superfluous resin. The liquid photo-sensitive resin is supplied through the middle of the three frame sides.

Thus, the spacer frame functions firstly to hold the transparent cover film on the hollow structure in close contact therewith, secondly to speedily and homogeneously spread the liquid photo-sensitive resin over the transparent cover film without intrusion of foams, and thirdly to provide a sealed space when a supporting base plate is placed upon the spacer frame, the thickness of the space corresponding to that of the relief printing plate to be formed.

Preferably, the spacer frame is fitted on the upper periphery of the hollow structure in close contact therewith and has a channel along the three frame sides thereof for guiding the liquid photo-sensitive resin upon the cover film.

More preferably, the apparatus comprises a supply means for the cover film. The supply means has a supply roll for the cover film, means for guiding the cover film along the underside of the spacer frame under a predetermined tension, and a winder at the front end of the spacer frame. The spacer frame is connected to the framework of the apparatus to be movable from an operative position where the spacer frame is fitted on the hollow structure in close contact therewith to a rest position which is parallel to but obliquely-upwards of the operative position.

In this structure, lengths of the transparent cover film are sucessively supplied to the underside of the spacer frame and are brought into close contact with the image bearing negative only by moving the spacer frame from the rest position to the operative position. After the photo-sensitive resin is subjected to exposure treatment by the ultraviolet rays, the spacer frame is moved up to the rest position and the transparent cover film stained by the resin is wound on a winder at the front end of the spacer frame, so that a new length of transparent cover film is successively supplied to the underside of the spacer frame for the next use.

Other objects and features of the present invention will become more apparent from the following description of a preferred embodiment of the present invention when taken in conjunction with the accompanying drawings, in which.

Figure 1:
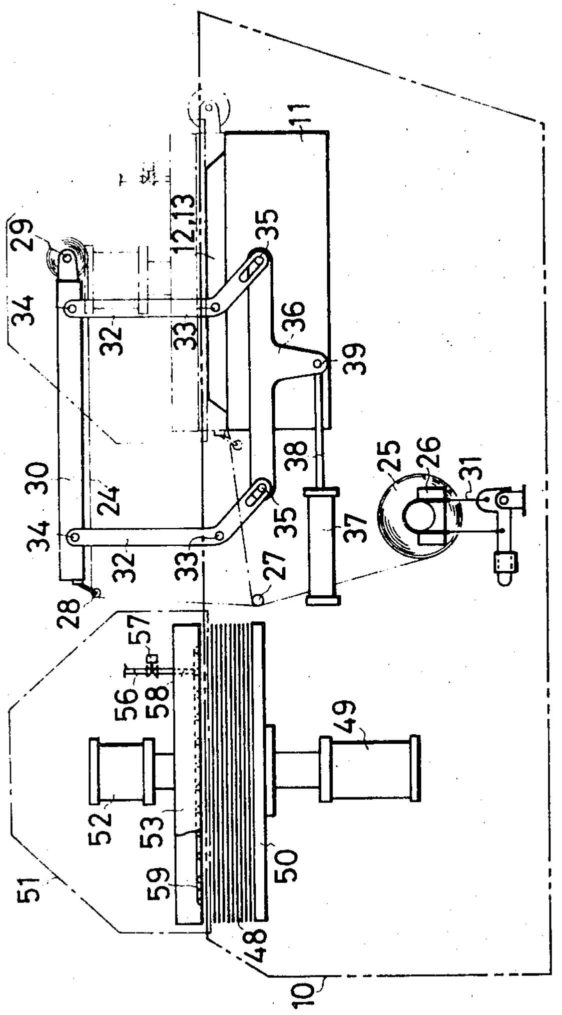
FIG. 1 is a schematic side view showing an apparatus for forming a relief printing plate from a liquid photo-sensitive resin according to the present invention.
Figure 2:
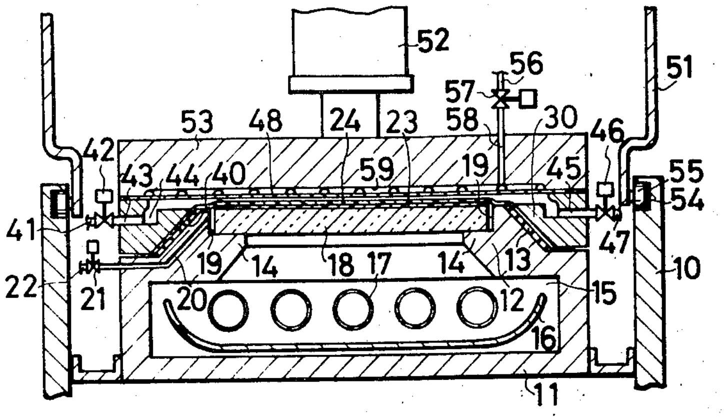
FIG. 2 is a vertically sectioned front view showing the main portions of the apparatus in FIG. 1, wherein a spacer frame is at an operative position.
Figure 3:
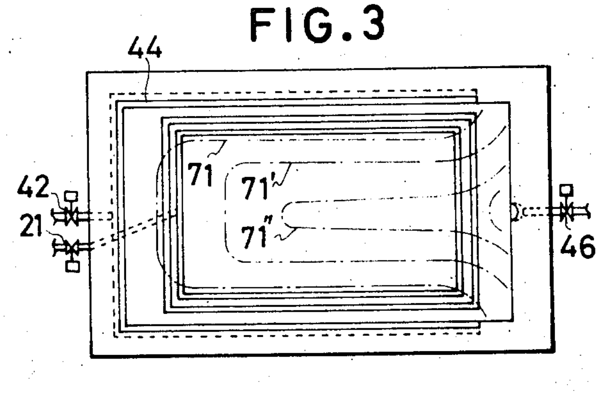
FIG. 3 is a plan view showing a flow pattern of the liquid photo-sensitive resin in the spacer frame.

Referring to FIGS. 1 and 2, an apparatus of the present invention comprises a hollow structure 11 secured to a framework 10. The hollow structure 11 has a trapezoidal upper portion 12 defined by four slanted trapezoidal surfaces on which packings 13 are adhered. The hollow structure 11 has provided therein a recess 15 at the bottom of which a light source 17 of ultraviolet rays is provided above a reflector 16. Preferably, the light source 17 is several fluorescent lamps or mercury-arc lamps. The recess 15 has at its upper surface a stepped shoulder 14 on which a rectangular transparent glass plate 18 is placed to close the recess 15. The stepped shoulder 14 is formed in such a manner that when the glass plate 18 is placed on the shoulder 14, the top surface of the glass plate 18 is flush with the top surface of the hollow structure 11. The outer peripheral surfaces of the glass plate 18 are slightly spaced from the upper vertical surfaces of the recess 15, thereby forming a space 19 therebetween which is rectangular in plan view as shown in FIG. 3. The space 19 is connected with a vacuum source (not shown) through a passage 20 passing through the trapezoidal upper portion 12 of the hollow structure 11, electromagnetic valve 21, and a pipe 22.

An image bearing negative 23 is placed on a transparent glass plate 18 and is covered with a transparent thin cover film 24 supplied from a roll 25 thereof. The roll of the cover film is rotatably supported by a supporting member 26.

A spacer frame 30 is provided, which has inner lower surfaces defined by four slanted trapezoidal surfaces which substantially match the trapezoidal surfaces at the upper portion 12 of the hollow structure 11, an inner top surface which is substantially on the same level as the top surfaces of the hollow structure 11 and the glass plate 18, and an outer top surface which is on a level higher than the inner top surface. As shown in FIGS. 2 and 3, the spacer frame 30 further has a channel 44 along three sides of the spacer frame 30. The channel 44 is connected with the inner top surface of the spacer frame 30 and has a bottom surface the level of which is lower than that of the inner top surface. At the center portion of the middle frame side of the three frame sides is provided an inlet hole 43 through which the channel 44 is connected with a photo-sensitive resin supply pipe 41 through an electromagnetic valve 42. A resin outlet hole 45 is provided through the remaining frame side opposite to the resin supply inlet hole 43. The resin discharge hole 45 is connected with a storage tank (not shown) for superfluous photo-sensitive resin through an electromagnetic valve 46 and a pipe 47.

The spacer frame 30 is connected to the frame work 10 by two pairs of angularaly bent arms 32. Each of the bent arms 32 has a first end pivotably connected to a side surface of the spacer frame, a bent portion pivotably connected to the framework 10, and a second end provided with an elongated slot. The second end of the bent arm 32 is connected to an upper end of a T-shaped link 36 by a pin 35 passing through the slot. The T-shaped link 36 is connected at its lower end to a piston rod 38 of an hydraulic cylinder 37 by a pin 39. The spacer frame 30 is so connected to the piston rod 38 of the cylinder 37 that by moving the piston rod 38 back and forth, the spacer frame 30 moves, while remaining parallel to upper portion 12, from an operative position shown by chain lines in FIG. 1 to a rest position shown by solid lines in FIG. 1 which is parallel to but obliquely-upwards of the operative position.

The cover film drawn out from the roll 25 is guided by a bar 27 mounted on the framework 10 and another bar 28 mounted at the rear end of the spacer frame 30 so as to travel along the underside of the spacer frame 30, and is wound up round a rotary shaft 29 at the front end of the spacer frame 30. In order that the cover film 24 will not be slackened, tension means, such as a hand brake 31, is provided on the roll to apply an appropriate tension to the cover film 24. Although the rotary shaft 29 for winding up the cover film may be manually operated, it is preferable to drive the shaft 29 by a reduction motor through a disengageable coupling means. The wind-up direction of the rotary shaft 29 is such that the upper side of the cover film will be placed inside when wound.

Referring now to the supply supporting base plates 48 to be placed on the outer top surface of the spacer frame 30 in the operative position thereof, a multiplicity of the supporting base plates 48 are stacked upon a platform 50 at the rear portion of the framework 10 as shown in FIG. 1. The platform 50 is moved up and down by a hydraulic cylinder 49. Formed longitudinally along the framework 10 are guide grooves 54 in which are fitted rolls 55 carried at the lower ends of a cover member 51, whereby the cover member is movable between a position above the platform 50 and the operative position of the spacer frame 30 (see FIG. 2.). Although the movement of the cover member 51 may be effected by manual operation, it is preferable to effect such movement by an appropriate mechanical driving means operated, for example, by a motor or hydraulic cylinder. Inside of the cover member 51 is mounted a pressing board 53 which is moved up and down by a hydraulic cylinder 52. The pressing board 53 has a hole 58 made therethrough, which is connected with a vacuum source (not shown) through an electromagnetic valve 57 and a pipe 56. The hole 58 is also connected with grid-like grooves 59 formed in the underside of the pressing board 53. Although a single hole 58 has been provided through the pressing board 53, a plurality of holes 58 may be provided therethrough, which are each connected with the vacuum source (not shown).

Figure 4:
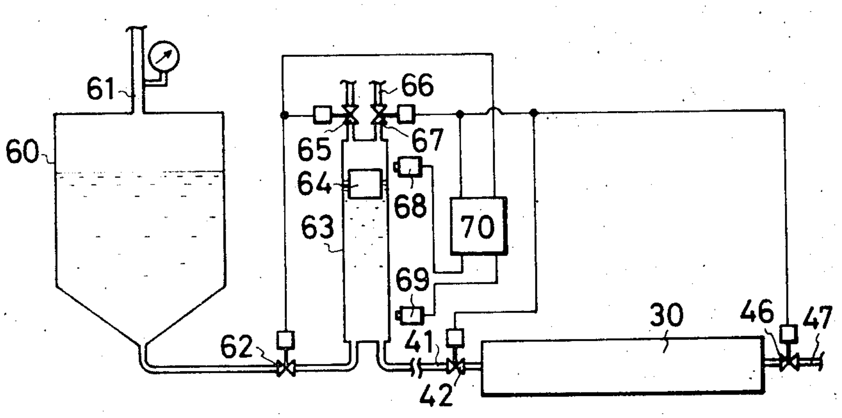
FIG. 4 is a schematic view showing a means for supplying a predetermined amount of the liquid photo-sensitive resin to the spacer frame.

Reference is now made to means for supplying a predetermined amount of the liquid photo-sensitive resin onto the cover film 24 through the spacer frame 30. As shown in FIG. 4, the supply means comprises a storage tank 60 for the liquid photo-sensitive resin, a measuring cylinder 63, a discharge valve 42, and control means 70 for various valves. The storage tank 60 is connected with a compressed air supply source (not shown) through a pipe 61, so that the liquid photo-sensitive resin in the tank is under a fixed pressure. The storage tank 60 is connected with the measuring cylinder 63 through a pipe and an electromagnetic valve 62, the pipe having the respective ends opening into the lower ends of the storage tank 60 and the measuring cylinder 63. The measuring cylinder 63 is connected with the inlet hole 43 in the spacer frame 30 through the pipe 41 and the discharge valve 42, the pipe 41 opening into the lower end of the measuring cylinder 63.

The measuring cylinder 63 has provided therein a float 64 adapted to move up and down in accordance with the liquid level in the cylinder 63. Extending out of the top of the measuring cylinder 63 are a pipe 66 connected to a compressed air supply source (not shown) through an electromagnetic valve 67 and a pipe opening to the atmosphere through an electromagnetic valve 65. Externally of and close to the measuring cylinder 63 are provided upper and lower proximity switches 68 and 69 adapted to cooperate with the float 64.

The control means 70 functions to control opening and closing of the various valves on receiving input signals from the upper and lower proximity switches 68 and 69. That is, when the valves 62 and 65 are open with the other valves being closed, the liquid photo-sensitive resin is supplied into the measuring cylinder 63 through the pipe with the result that the float 64 rises. When the upper proximity switch 68 responds to the float 64, the control means 70 is operated to close the valves 62 and 65, whereby a predetermined amount of the liquid photo-sensitive resin is stored in the measuring cylinder 63. If it is desired to discharge the resin, the control means opens the valves 67, 42 and 46 while closing the other valves, whereby the compressed air is supplied into the measuring cylinder 63 through the pipe 66 to force out the resin into the spacer frame 30. When the lower proximity switch 69 responds to the float 64 which is descending during the discharge of the resin, the control means closes the valves 67, 42 and 46 and opens the valve 62 and 65.

Turning to the operation of the present apparatus, now, it is assumed that the spacer frame 30 is at the rest position, that the uppermost supporting base plate 48 of the stack upon the platform 50 is held on the underside of the pressing board 53 by vacuum because the valve 57 is open, and that the cylinder 63 contains the measured amount of resin.

After setting the image bearing negative 23 upon the transparent glass plate 18 placed upon the hollow structure 11, oil if fed into the hydraulic cylinder 37 to move the piston rod 38 connected to the lower end of the T-shaped link 36 inwardly. Because the spacer frame 30 is operatively connected to the T-shaped link 36 through the four bent arms 32 pivoted to the framework 10, the spacer frame 30 moves down to the operative position shown by chain lines in FIG. 1, carrying the transparent cover film on the underside of the spacer frame 30. At the operative position, the four slanted trapezoidal surfaces on the inner lower portions of the spacer frame 30 press the cover film 24 under these surfaces against the packings 13 on the four trapezoidal surfaces at the upper portion 12 of the hollow structure 11. At this time, as the cover film 24 is stretched under appropriate tension by the hand brake 31, and the cover film 24 is evenly stretched on the negative 23. Then, the electromagnetic valve 21 is opened to evacuate any air between the glass plate 18, the negative 23 and the cover film 24 so as to bring them into close contact with one another.

The cover member 51 moves forwardly to place the supporting base plate 48 upon the outer top surface of the spacer frame 30. Thereafter, oil is fed into the hydraulic cylinder 52 to press the supporting base plate against the spacer frame 30. Thus, a hermetically sealed space is formed between the supporting base plate 48, the spacer frame 30 and the cover film 24, in which the space between the supporting base plate 48 and the cover film 24 corresponds to the thickness of the relief printing plate to be formed.

Then, the control means 70 is operated to open the valves 67, 42 and 46 to supply the liquid photo-sensitive resin into the hermetically sealed space. The resin which has passed through the inlet hole 43 of the spacer frame 30 is guided to the three frame sides along the channel 44 therein and overflows above the inner top surface of the spacer frame and above the cover film. The resin flows from the three frame sides toward the outlet hole 45 along flow patterns shown by chain lines 71, 71′ and 71″ in FIG. 3. Both of the electromagnetic valves 42 and 46 at the inlet and outlet sides of the spacer frame 30 may be arranged such that they are closed simultaneously by the operation of the proximity switch 69 or such that the valve 42 at the inlet side is first closed and then the valve 46 at the outlet side is closed after a certain time lag. However, if it is desired to close both valves 42 and 46 simultaneously, the underside of the pressing board has to be corrected beforehand so that it will positively meet with the bend of the glass plate 18 caused by the pressure of the supplied resin.

After the hermetically sealed space is filled with the liquid photo-sensivitive resin, the ultraviolet rays are applied for a predetermined time period to the resin from the light source 17 through the transparent glass plate 18 and the image bearing negative 23, whereby the photo-polymerization is induced in the resin corresponding to the image of the negative. Then, the electromagnetic valve 57 for leading the vacuum to the underside of the pressing board 53 is closed and the pressing board 53 is moved up and retracted to the rear portion of the framework 10 with the cover member 51. The supporting base plate 48, which is now integral with the resin layer, is stripped off the cover film 24. The resin layer is then subjected to finishing steps comprising washing-out of non-exposed resin portions, drying and post-exposure treatments to finally obtain a desired relief printing plate. Any leftover resin on the cover film is wrapped up therein by winding it about the shaft at the front end of the spacer frame 30 while the latter is at the rest position, whereby a new length of cover film 24 is disposed under the spacer frame 30.

Although the present invention has been described with reference to the preferred embodiment thereof, many modifications and alterations may be made within the spirit of the present invention.

What is claimed is:

1. An apparatus for forming a relief printing plate from a liquid photo-sensitive resin comprising:

a framework;

a hollow structure connected to said framework and closed at its upper portion with a transparent glass plate on which an image bearing negative and a transparent cover film are laminated in that order, said hollow structure having a source of ultraviolet rays therein and a vacuum suction means for bringing said cover film into close contact with said negative placed on said glass plate;

a spacer frame removably and closely fitted on said hollow structure to hold said cover film therebetween and having three frame sides for guiding the liquid photo-sensitive resin onto said cover film and one remaining frame side for discharging superfluous resin;

means for placing a supporting base plate on said spacer frame, said supporting base plate and said cover film defining therebetween the thickness of said relief printing plate to be formed; and means for supplying the liquid photo-sensitive resin through the middle frame side of said three frame sides.

2. An apparatus as claimed in claim 1, wherein said spacer frame is fitted in close contact with the upper periphery of said hollow structure and has a channel along said three frame sides thereof for guiding the liquid photo-sensitive resin onto said cover film.

3. An apparatus as claimed in claim 1, further comprising a supply means for said cover film, said supply means having a supply roll for said cover film, means for guiding said cover film along the underside of said spacer frame under a predetermined tension, and a winder at the front end of said spacer frame, said spacer frame being connected to said framework to be movable from an operative position where said spacer frame is closely fitted on said hollow structure to a rest position which is parallel to but obliquely-upwards of said operative position.

4. An apparatus as claimed in claim 1, wherein said supply means for the liquid photo-sensitive resin comprises:

a storage tank for said liquid photo-sensitive resin, said tank being connected with a compressed air supply means at its upper portion;

a measuring container connected with said storage tank through a first valve means, said measuring container having a second valve means through which said container is connected with atmosphere and a third valve means through which said container is connected with a compressed air supply means;

a fourth valve means through which said measuring container is connected with said intermediate frame side of said spacer frame; and control means for said four valve means, said control means opening said first and second valve means and closing said third and fourth valve means when said resin in said measuring container is decreased to a predetermined amount, said control means closing said first and second valve means and opening said third and fourth valve means when said resin in said container is increased to a predetermined amount and when the supply of said resin into said spacer frame is desired.

5. An apparatus as claimed in claim 3, wherein said means for placing the supporting base plate on said spacer frame comprises a platform provided at the rear portion of said framework and movable up and down, a stack of the supporting base plates placed upon said platform, and a pressing board for holding and lifting the uppermost supporting base plate and carrying it above said spacer frame at said operative position.

6. An apparatus as claimed in claim 3, wherein said spacer frame is movably connected to said framework by two pairs of bent arms, each of said bent arms having a first end pivotably connected to said spacer frame, a bent portion pivotably connected to said framework, and a second end pivotably and slidably connected to an upper end of a T-shaped link which is connected to a piston rod of a cylinder at the lower end thereof.

* * * * *